United States Patent [19]

Daschievici et al.

[11] 4,072,009
[45] Feb. 7, 1978

[54] PRESSURE SYSTEM FOR DRIVING THE WHEELS OF A VEHICLE

[75] Inventors: Stefan Daschievici; Cezar Ferat, both of Braila, Romania

[73] Assignee: Institutul de Cercetari si Proiectari Pentru Utilaje de Constructii de Drumuri(I.C.P.U.C.) Braila, Braila, Romania

[21] Appl. No.: 734,597

[22] Filed: Oct. 21, 1976

[51] Int. Cl.[2] .................. F15B 13/06; F15B 13/09
[52] U.S. Cl. ................................. 60/484; 60/486; 180/44 F
[58] Field of Search .................. 60/427, 484, 486; 180/44 F, 44 R, 49, 6.3

[56] References Cited

U.S. PATENT DOCUMENTS

| | | | |
|---|---|---|---|
| 1,977,033 | 10/1934 | Adams | 60/484 |
| 3,261,421 | 7/1966 | Forster et al. | 180/66 R |
| 3,623,322 | 11/1971 | Hancock | 60/484 |

*Primary Examiner*—Edgar W. Geoghegan
*Attorney, Agent, or Firm*—Haseltine, Lake & Waters

[57] ABSTRACT

A pressure system for driving the wheels of a vehicle in which the wheel driving motors are arranged in pairs on opposite sides of the vehicle comprising a duplex pump assembly composed of two pumps connected in parallel and coupled in open circuit with a respective pair of wheel driving motors. A flow divider is provided in each circuit for dividing the pressure fluid delivered by the respective pump to the wheel driving motors of the associated pair.

2 Claims, 1 Drawing Figure

PRESSURE SYSTEM FOR DRIVING THE WHEELS OF A VEHICLE

FIELD OF THE INVENTION

The invention relates to a pressure system for driving the wheels of a vehicle, for example, the wheels of a front loader in which all of its wheels can be driving wheels and steering is effected by skidding of the wheels.

BACKGROUND

Pressure apparatus of the above type are known for driving the wheels in such types of loaders and various arrangements have been employed such as hydrodynamic drives using torque-converters with end mechanical transmissions and mechanical drives with speed variation devices. These drives have the disadvantage that they are complex from a constructional point of view and, additionally, they also operate with low efficiency.

SUMMARY OF THE INVENTION

An object of the invention is to provide a pressure apparatus and particularly a hydrostatic plant which avoids the aforenoted disadvantages.

In accordance with the invention the apparatus comprises a duplex pump assembly with additive power control which operates in open circuit arrangement, said duplex pump including two pumps connected in parallel each of which drives one pair of wheel driving motors on a respective side of the vehicle through a hydraulic flow divider.

BRIEF DESCRIPTION OF THE DRAWING

The sole FIGURE of the drawing is a diagrammatic illustration of a hydrostatic plant for driving the wheels of a vehicle.

DETAILED DESCRIPTION

Figure 1:
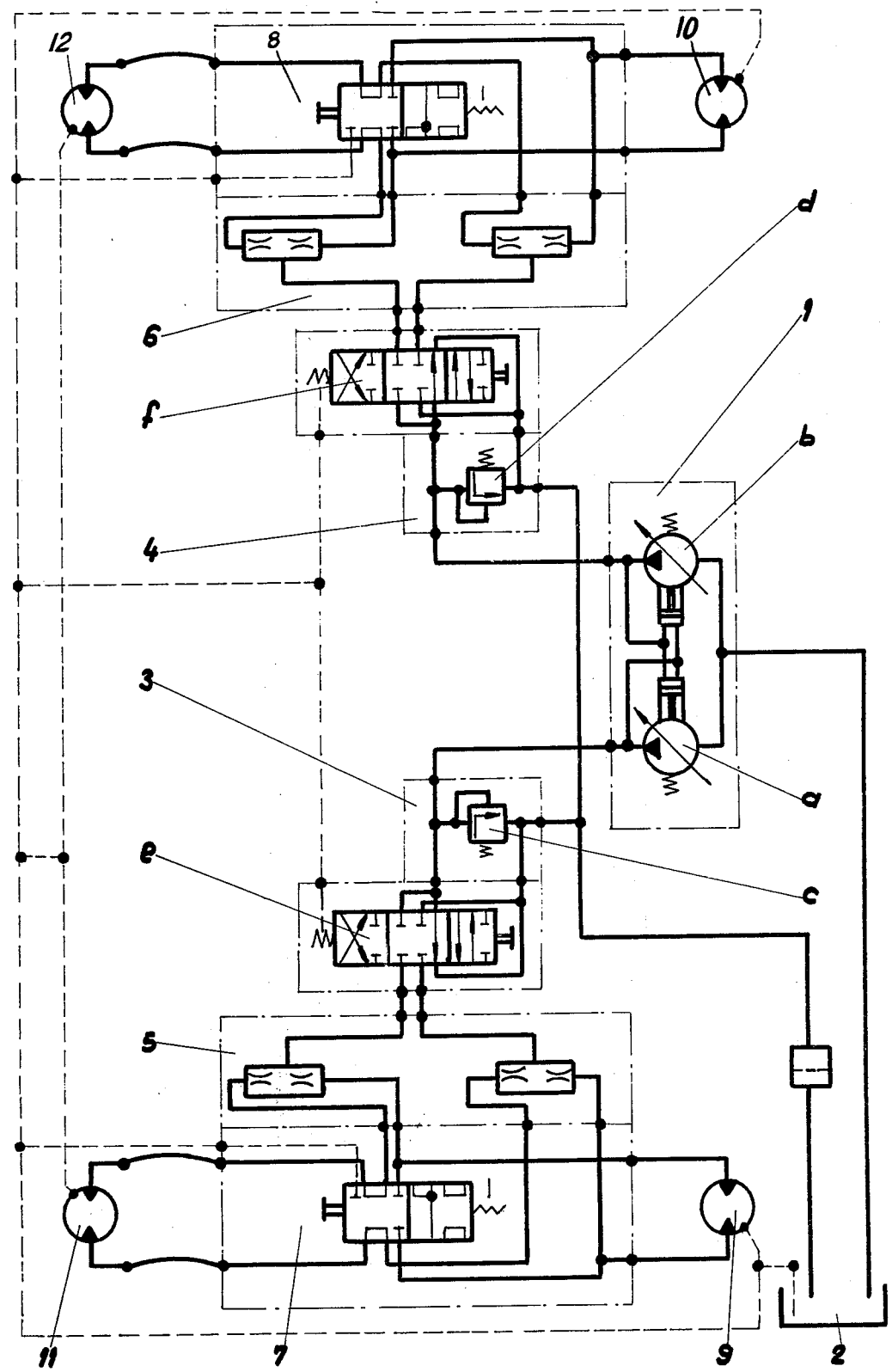

Referring to the drawing the hydrostatic plant illustrated therein which serves for driving the wheels of a vehicle comprises a duplex pump 1 with additive power control. The duplex pump 1 is composed of individual pumps *a* and *b* connected in parallel and pump 1 aspirates oil from a reservoir or tank 2 and delivers the oil under pressure to the vehicle. Each of the two pumps *a* and *b* supplies a respective pair of wheels on opposite sides of the vehicle. Oil is delivered under pressure from the pumps *a* and *b* to respective distributor units 3 and 4 provided with relief valves *c* and *d*. The distributor units 3 and 4 include distributors *e* and *f* which control flow of the pressure oil to flow dividers 5 and 6 in one of two directions depending on the control effected by the distributors *e* and *f*.

From the flow dividers 5 and 6 pressure oil is delivered through switches 7 and 8 to the four driving wheel motors 9, 10, 11 and 12. Two distinct travel speeds of the vehicle can be achieved by means of two working positions of the switches 7 and 8. In one position the pressure oil is delivered to all four driving wheel motors 9, 10, 11 and 12 and in the other position the pressure oil is delivered only to the two rear driving wheel motors 9 and 10 while the front driving wheel motors are connected in short circuit to discharge back to the tank 2.

The hydrostatic plant for driving the wheel of a vehicle according to the invention has the advantages of providing high efficiency in the transmission while simplifying the construction by eliminating mechanical end transmissions.

Although the invention has been described in conjunction with a preferred embodiment thereof, it will become evident to those skilled in the art that numerous modifications and variations can be undertaken without departing from the scope and spirit of the invention as defined in the attached claims.

What is claimed is:

1. Apparatus for driving wheels of a vehicle in which the wheels are arranged in pairs on opposite sides of the vehicle, said apparatus comprising a duplex pump assembly including two pumps connected in parallel, a hydraulic supply, said pumps being connected to said supply, and means connecting each pump in open circuit relation with a respective pair of wheel driving motors, said means comprising distributors connected in series to respective pumps, a pair of flow dividers connected in series to respective distributors, and switch control means connected to respective pairs of flow dividers and to respective wheel driving motors of the associated wheel pair for selectively feeding pressure fluid to said driving motors for selecting one of two distinct travel speeds of the vehicle, one corresponding to drive of all four wheel motors, the other corresponding to drive of the two wheel motors of the rear wheels, the front wheel motors then being connected in short circuit to said supply.

2. Apparatus as claimed in claim 1 wherein said means connecting each pump to the respective pair of wheel motors further comprises a relief valve between each pump and said flow divider means.

* * * * *